(12) United States Patent
Shen et al.

(10) Patent No.: US 7,433,471 B2
(45) Date of Patent: Oct. 7, 2008

(54) MPEG-21 DIGITAL CONTENT PROTECTION SYSTEM

(75) Inventors: Sheng Mei Shen, Singapore (SG);
Zhongyang Huang, Singapore (SG);
Ming Ji, Singapore (SG); Takafumi Ueno, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 627 days.

(21) Appl. No.: 10/523,193

(22) PCT Filed: Oct. 14, 2003

(86) PCT No.: PCT/JP03/13120

§ 371 (c)(1),
(2), (4) Date: Jan. 27, 2005

(87) PCT Pub. No.: WO2005/036882

PCT Pub. Date: Apr. 21, 2005

(65) Prior Publication Data

US 2005/0271205 A1    Dec. 8, 2005

(51) Int. Cl.
*H04N 7/167* (2006.01)
(52) U.S. Cl. .............................. 380/201; 726/26; 726/27
(58) Field of Classification Search .................. 726/26, 726/27; 380/201
See application file for complete search history.

(56) References Cited

U.S. PATENT DOCUMENTS

| 6,643,330 | B1 * | 11/2003 | Nakagawa et al. | 375/240.28 |
| 6,891,953 | B1 * | 5/2005 | DeMello et al. | 380/277 |
| 6,931,541 | B1 * | 8/2005 | Nakagawa | 713/193 |
| 6,970,849 | B1 * | 11/2005 | DeMello et al. | 705/52 |
| 6,981,262 | B1 * | 12/2005 | DeMello et al. | 719/310 |
| 7,099,473 | B2 * | 8/2006 | Maeda | 380/239 |
| 7,099,491 | B2 * | 8/2006 | Takaku | 382/100 |
| 7,158,953 | B1 * | 1/2007 | DeMello et al. | 705/51 |
| 7,231,043 | B2 * | 6/2007 | Maeda | 380/202 |
| 2001/0033660 | A1 * | 10/2001 | Maeda | 380/232 |
| 2001/0041061 | A1 * | 11/2001 | Nakagawa | 386/111 |
| 2002/0035544 | A1 * | 3/2002 | Wakao et al. | 705/51 |

(Continued)

FOREIGN PATENT DOCUMENTS

EP    1 079 627    2/2001

(Continued)

OTHER PUBLICATIONS

J. H. Kim et al., "MPEG-21 IPMP" Online, Sep. 14, 2002, XP002284699, retrieved from the Internet: URL:http://charybdis.mit.csu.edu.au/{mantolov/CD/ICITA2002/papers/177-21.pdf>.

(Continued)

*Primary Examiner*—Nasser Moazzami
*Assistant Examiner*—David Garcia Cervetti
(74) *Attorney, Agent, or Firm*—Wenderoth, Lind & Ponack, L.L.P.

(57) ABSTRACT

Digital Rights Management (DRM) or Intellectual Property Management and Protection (IPMP) for generic digital content wherein a IPMP Control Graph and a REL-IPMP Control Graph carries protection signalling and rights expression data. Both content packaging and terminal processing relating to the above control graph are clearly defined and elaborated.

8 Claims, 11 Drawing Sheets

U.S. PATENT DOCUMENTS

| | | | |
|---|---|---|---|
| 2002/0156712 A1* | 10/2002 | Rambhia | 705/36 |
| 2003/0016744 A1* | 1/2003 | Nakagawa | 375/240.01 |
| 2003/0028397 A1* | 2/2003 | Tagashira et al. | 705/1 |
| 2003/0118188 A1* | 6/2003 | Collier et al. | 380/277 |
| 2003/0163430 A1* | 8/2003 | Takaku | 705/52 |
| 2003/0229900 A1* | 12/2003 | Reisman | 725/87 |
| 2004/0031058 A1* | 2/2004 | Reisman | 725/112 |
| 2005/0044016 A1* | 2/2005 | Irwin et al. | 705/30 |
| 2005/0262520 A1* | 11/2005 | Burnett et al. | 719/320 |
| 2007/0086664 A1* | 4/2007 | Kim et al. | 382/239 |

FOREIGN PATENT DOCUMENTS

| | | |
|---|---|---|
| WO | 03/039155 | 5/2003 |
| WO | 03/067893 | 8/2003 |
| WO | 03/075575 | 9/2003 |

OTHER PUBLICATIONS

"Information Technology—Multimedia Framework—Part 5: Rights Expression Language", International Organization for Standardization ISO/IEC JTC 1/SC 29/WG 11 Coding of Moving Pictures and Audio, ISO/IEC JTC 1/SC 29/WG 11 N5839, Jul. 2003, Trondheim, Norway.

* cited by examiner

MPEG-21 DIGITAL CONTENT PROTECTION SYSTEM

BACKGROUND OF THE INVENTION

1. Field of the Invention

The present invention relates to Digital Rights Management (DRM) or Intellectual Property Management and Protection (IPMP) for generic digital content, especially relates to the protection and management of digital content independent of any data format.

2. Background of the Related Art

As various kinds of networks are widely deployed, it will be demanded that digital content can be delivered and distributed to a user, via such networks, besides using a CD or DVD. Whether or not it is secure to sell content in this way is a point of concern of the content owner.

As hard disks or other storage embedded devices become more and more prevalent, another issue is how the content protection technique can ensure the entitled rights to be exercised correctly.

As many different digital formats exist for packaging content in a digital form for easy transmitting over various network, question arises as to how protection technology can be among the different digital formats.

At the same time users have more demands for the convenience of low cost for enjoying content and sharing with their friends if they purchase such rights.

Conflict is always present since a content owner opposes illegal copying, and as a result to protect content their content using their own proprietary ways due to a lack of open protection techniques available in the market. This not only brings a big barrier for a content owner to sell content, but also brings a heavy cost for CE (consumer electronics) manufacturers to produce different versions of a product just to match with the various protection techniques used by the content provider.

MPEG-21 is trying to define a generic framework to enable transparent and augmented use of digital content across a wide range of networks and devices used by different communities. How to protect the contents when they are being used across network or devices, becomes a very important item in MPEG-21, which is the part 4 of MPEG-21, called MPEG-21 IPMP (Intellectual Property Management and Protection)

In the past, people working on a MPEG-4/2 IPMP Extension were required to define a content protection scheme based on a MPEG-4/2 system since the aim is to protect any content packaged in a MPEG-4/2 format.

In MPEG-21, a Digital Item (DI) is defined as a structured digital object for any digital content with a standard representation, identification and description, and it will be used as the fundamental unit of interchange, distribution and transaction within the MPEG-21 framework.

The Digital Item is declared and expressed using XML by Digital Item Declaration (DID). Besides a digital content which is represented as media resources in MPEG-21, such as video, music, and image, the DID provides the flexible structure to include various kinds of functional metadata. Such metadata is supposed to describe media resource format, to specify resource protection scheme, to give the resource an identification name, and to provide User preference, etc.

Besides the core part of DID technology, some other key technologies have also been elaborately developed or are under development. Digital Item Identification (DII), Digital Item Adaptation (DIA), Intellectual Property Management and Protection (IPMP), REL (Rights Expression Language)/ RDD (Rights Data Dictionary), as well as ER (Event Reporting) are all the important technologies for extensively exploiting the Digital Items' usage. All the functional metadata defined by these technologies can be placed into a DID document to aid the actual media resource consumption.

A content protection and management mechanism is highly requested to address most of the requirements raised by many different application domains, especially in the scope of MPEG-21 domain, to reflect the market needs.

The requirements on MPEG-21 IPMP are the problems to be targeted and solved here.

IPMP, especially MPEG-21 IPMP shall:

(i) support the management and protection of intellectual property in descriptors and description schemes;

(ii) provide for interoperability so that content is able to be played anywhere;

(iii) enable devices to dynamically discover, request, and obtain upgrades for supporting new media formats, IPMP tools and support;

(iv) provide mechanisms to reference Digital Item Descriptions as part of the language, make reference to external content descriptions;

(v) provide mechanisms to associate Expressions with composite Digital Items;

(vi) provide mechanisms to reference Containers or other aggregations of Digital Items;

(viii) flag that a particular Expression should be subject to protection the protection itself, if any, is provided by an IPMP system controlling the Expression as a Digital Item;

(viii) provide mechanisms to reference authentication schemes;

(ix) provide mechanisms to ensure that the IPMP is independent of the format or delivery channel of Digital Items;

(x) unambiguously articulate requirements relating to IPMP Tool and Features; and (xi) need to identify IPMP Tools and Features to build trusted IPMP implementations.

IPMP Tools and Features are components parts to build an IPMP-enabled Terminal or Peer. It should also possible for a Terminal or Peer to disclose its IPMP capability (IPMP Tools and Features). This makes it possible for a communicating Terminal or Peer to examine IPMP capability of another Terminal or Peer before deciding to engage with it.

BRIEF SUMMARY OF THE INVENTION

Methods of Digital Content Protection with Digital Rights Expression, comprising the following steps of parsing a digital content description, especially parsing a DID (Digital Item Declaration) in MPEG-21 scope;

retrieving a digital content identifier (content ID) which is used to identify the said digital content, especially a DII in MPEG-21 scope, or sub content identifier;

detecting a rights and protection description holder which contains rights and protection information applied to said digital content with the corresponding content ID, and here the holder called IPMP (Intellectual Property Management and Protection) Control Graph Holder or REL (Rights Expression Language)-IPMP Control Graph holder;

retrieving a flag from the said holder which indicates if said content is protected or belongs to free content;

processing the description information carried in said IPMP Control Graph or REL-IPMP Control Graph;

checking if rights descriptions or other metadata description is digital signed by retrieving a flag which is attached to said rights or other metadata; and if it is signed, preparing the corresponding digital signing tool which is indicated by ToolID;

retrieving a key license from a protected License Manager;

checking the integrity of said rights or metadata using said digital signing tool;

parsing said rights with their conditions following the rules which is pre-defined, especially following REL rules which is defined in MPEG-21 scope, and storing said entitled rights and conditions in a buffer for future checking;

checking if the said content is encrypted by retrieving a flag which is attached to said content; and if it is encrypted, preparing the corresponding encryption tool which is indicated by ToolID;

un-protecting said encrypted content using the said encryption tool with the said ToolID, and other information;

checking if said content is watermarked by retrieving a flag which is attached to said content; and if it is watermarked, preparing the corresponding watermarking tool which is indicated by ToolID for further action;

processing user's request against said entitled rights and conditions stored in the buffer;

exercising the rights requested by said user if it is entitled, and acting on said un-protected content for playing, rendering, recording, modifying, deleting, adapting, etc.

DETAILED DESCRIPTION OF THE INVENTION

Means of Solving the Problems

On the content packaging side, the above-mentioned problems are solved by:

(i) introducing the concept of IPMP Control Graph to refer to all the rights and protection information which is directly associated with the content;

(ii) defining IPMP Control Graph or REL-IPMP Control Graph as protection metadata holder to contain rights and protection information which is used to package and protect the content;

(iii) placing rights & condition in the IPMP Control Graph or REL-IPMP Control Graph;

(iv) placing content encryption information in the IPMP Control Graph or REL-IPMP Control Graph;

(v) placing watermarking information in the IPMP Control Graph or REL-IPMP Control Graph;

(vi) placing rights protection information in the IPMP Control Graph or REL-IPMP Control Graph;

(vii) placing and indicating key information which is used to encrypt content in the IPMP Control Graph or REL-IPMP Control Graph;

(viii) placing key/license information in the IPMP Control Graph or REL-IPMP Control Graph, or in Rights, DID, or somewhere indicated by keyLocation;

(ix) indicating which IPMP Tool is used for encryption, digital signing, watermarking with ToolID in the IPMP Control Graph or REL-IPMP Control Graph;

(x) associating rights and protection with the protected digital content or its sub content using content ID or DII and sub content ID; and (xi) placing IPMP Control Graph or REL-IPMP Control Graph in DID container or other appropriate place in other application domains.

On the terminal side, the above-mentioned problems are solved by:

(i) parsing DID to retrieve content ID or sub content ID, and IPMP Control Graph or REL-IPMP Control Graph;

(ii) parsing IPMP Control Graph or REL-IPMP Control Graph to retrieve Rights and Protection related descriptions;

(iii) invoking IPMP tools which are used to protect the content or rights, or other metadata;

(iv) retrieving key information from KeyData Holder directly of indirectly;

(v) retrieving a key license from a protected License Manager;

(vi) un-protecting the protected content using the above obtained information;

(vii) checking Rights' integrity using the tool indicated by ToolID;

(viii) parsing the rights and conditions which are embedded with the content;

(ix) retrieving watermarking descriptions and preparing for further action;

Operation of the Invention

Figure 3:
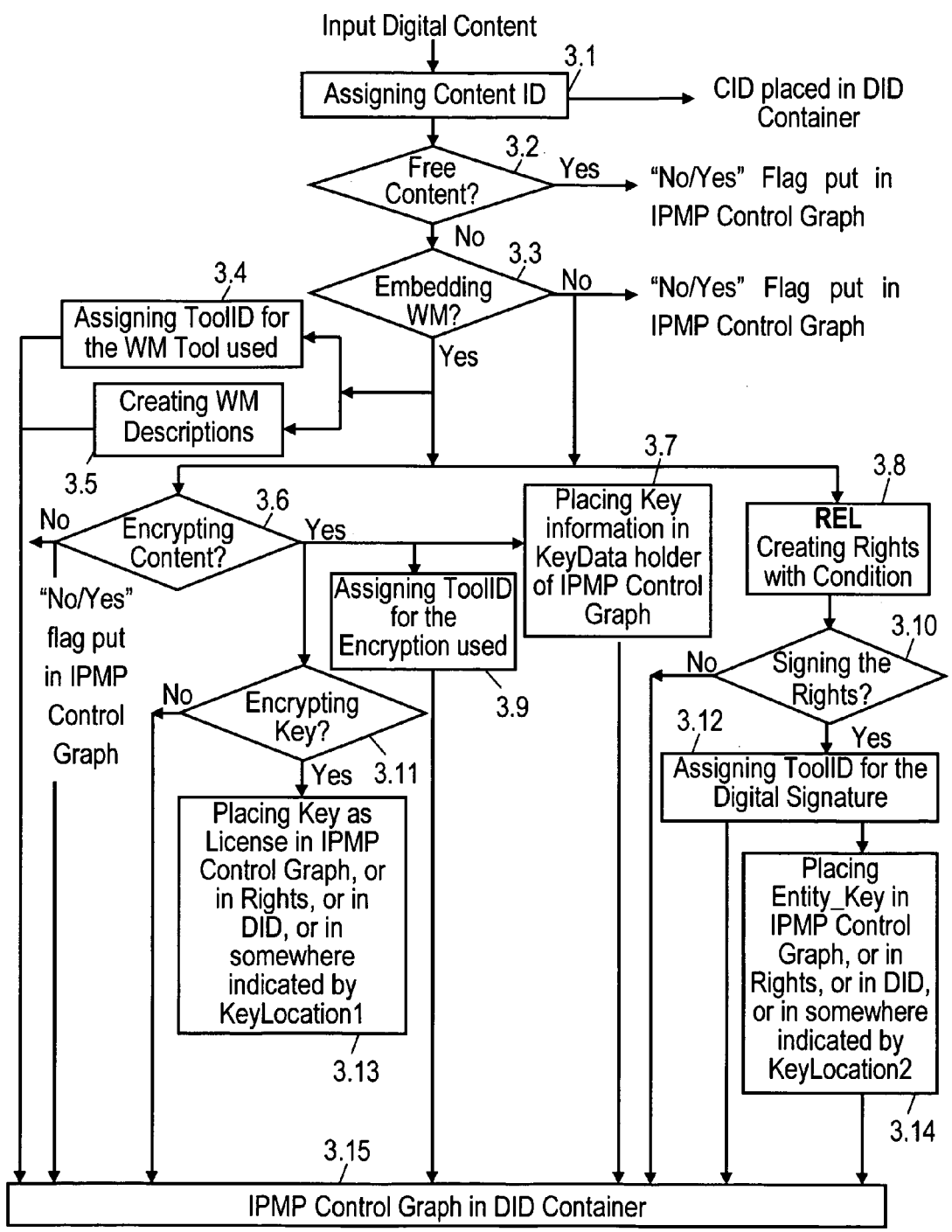
FIG. 3 shows Content Packaging Flow Chart with separate Rights & Protection.
Figure 7A:
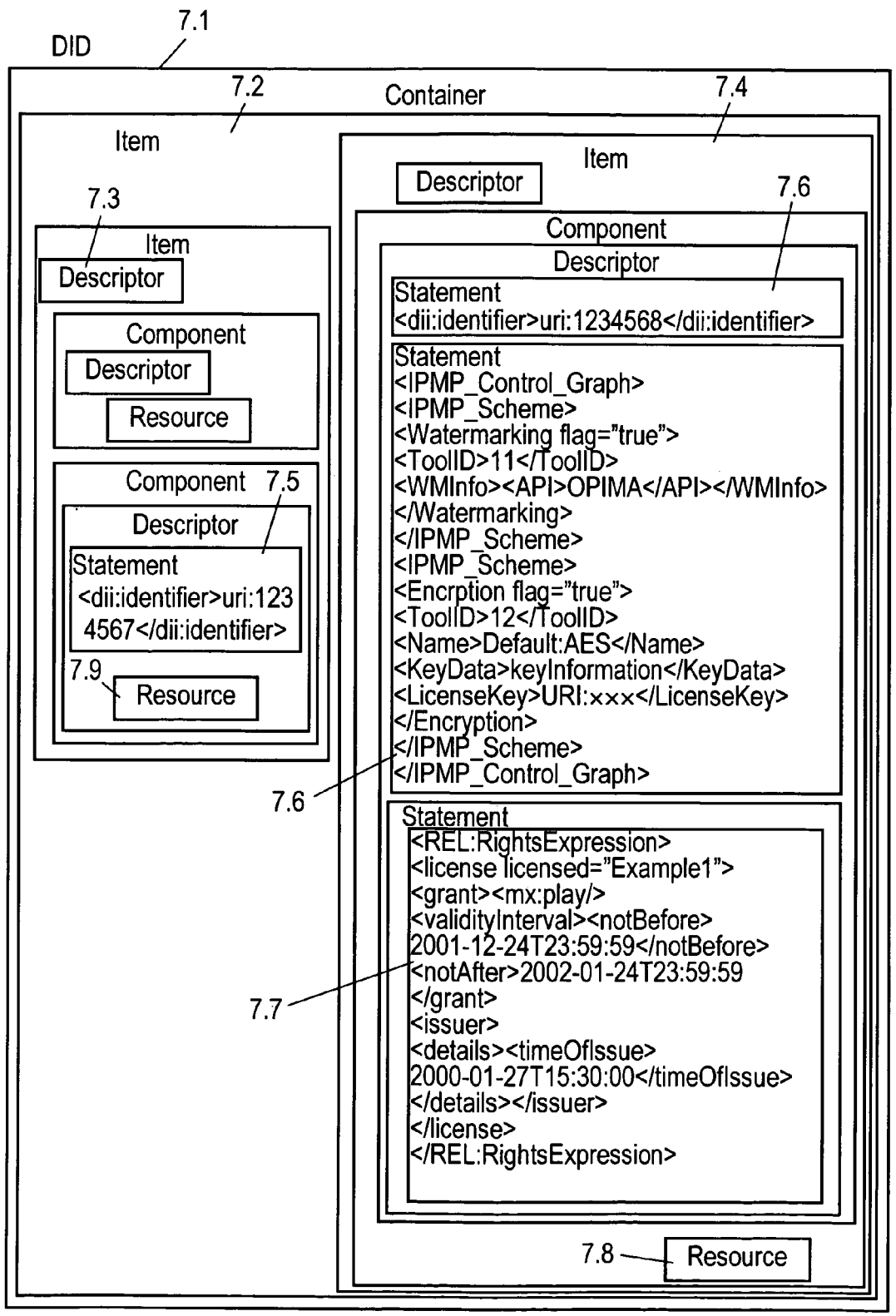
FIG. 7 shows IPMP Control Graph for Rights & Protection Information Carried in DID.
Figure 7B:
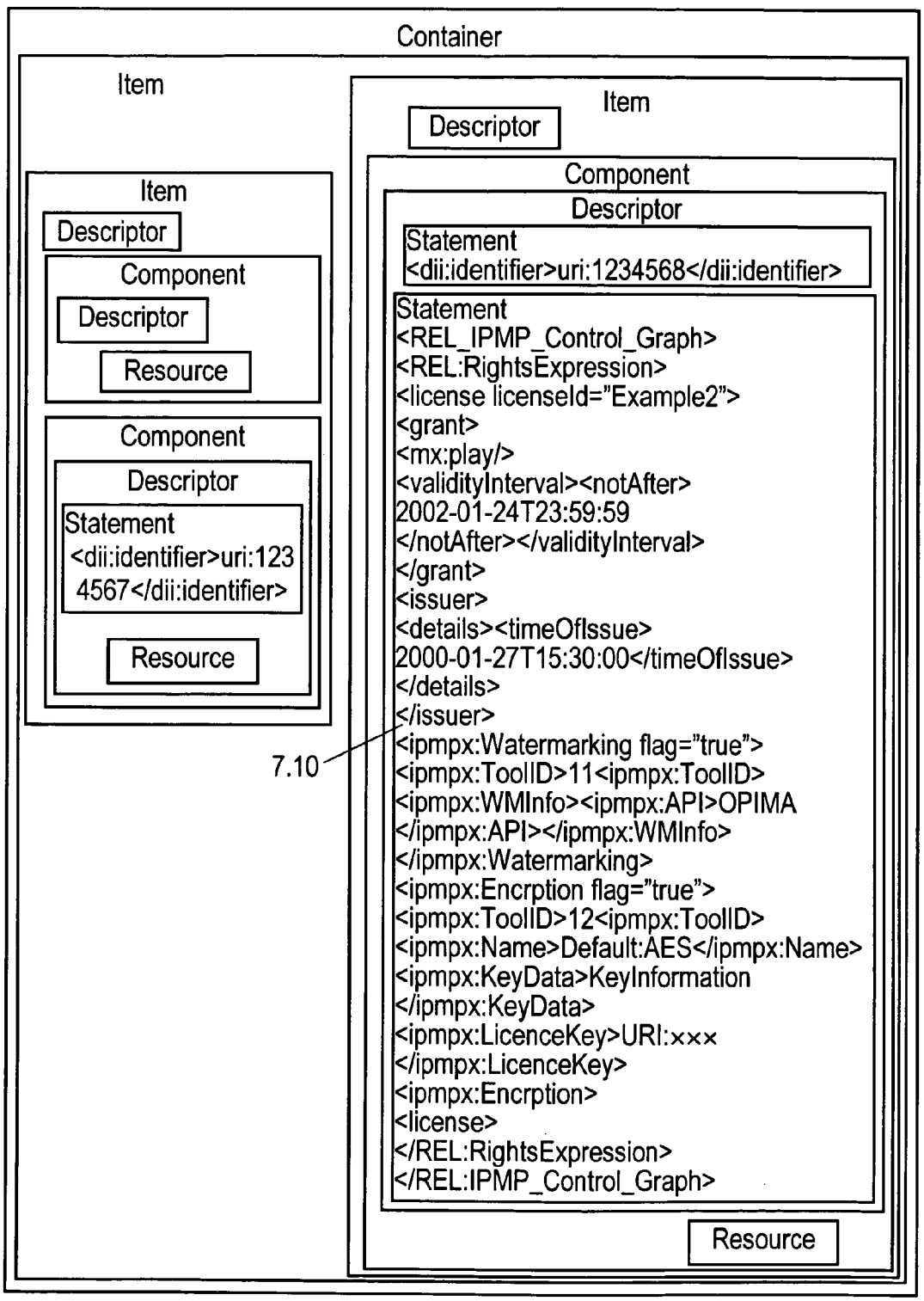

On the content production side as shown in FIG. 3, IPMP Control Graph is generated as shown in FIG. 7, to contain all the rights and protection information which is directly associated with the content identified by content Identifier (CID) or DII if MPEG-21 could be used.

The content could be watermarked using a certain watermarking tool to achieve certain functions, such as finger printing, persistent association, or copyright protection by embedding CID or other information.

The content can be encrypted by an IPMP tool with ToolIDXXX, where xxx is the number which is registered with RA (Registration Authority), to indicate which encryption algorithm is used. A default tool, such as AES, is defined for simple hardware to implement. The resulting Key information could be carried in IPMP Control Graph directly or by pointing to a location where the whole Key information data could be found. The encryption key can be further encrypted and finally a license could be generated and directly carried in either IPMP Control Graph, in REL data or other Rights Expression Data, or in DID itself, or in somewhere which can be indicated by KeyLocation indicator to be carried in IPMP Control Graph/REL/DID;

However the segments of key information would also possibly be packaged together with the associated content segments when the protected content is transmitted, via a network, for synchronization purpose.

Figure 4:
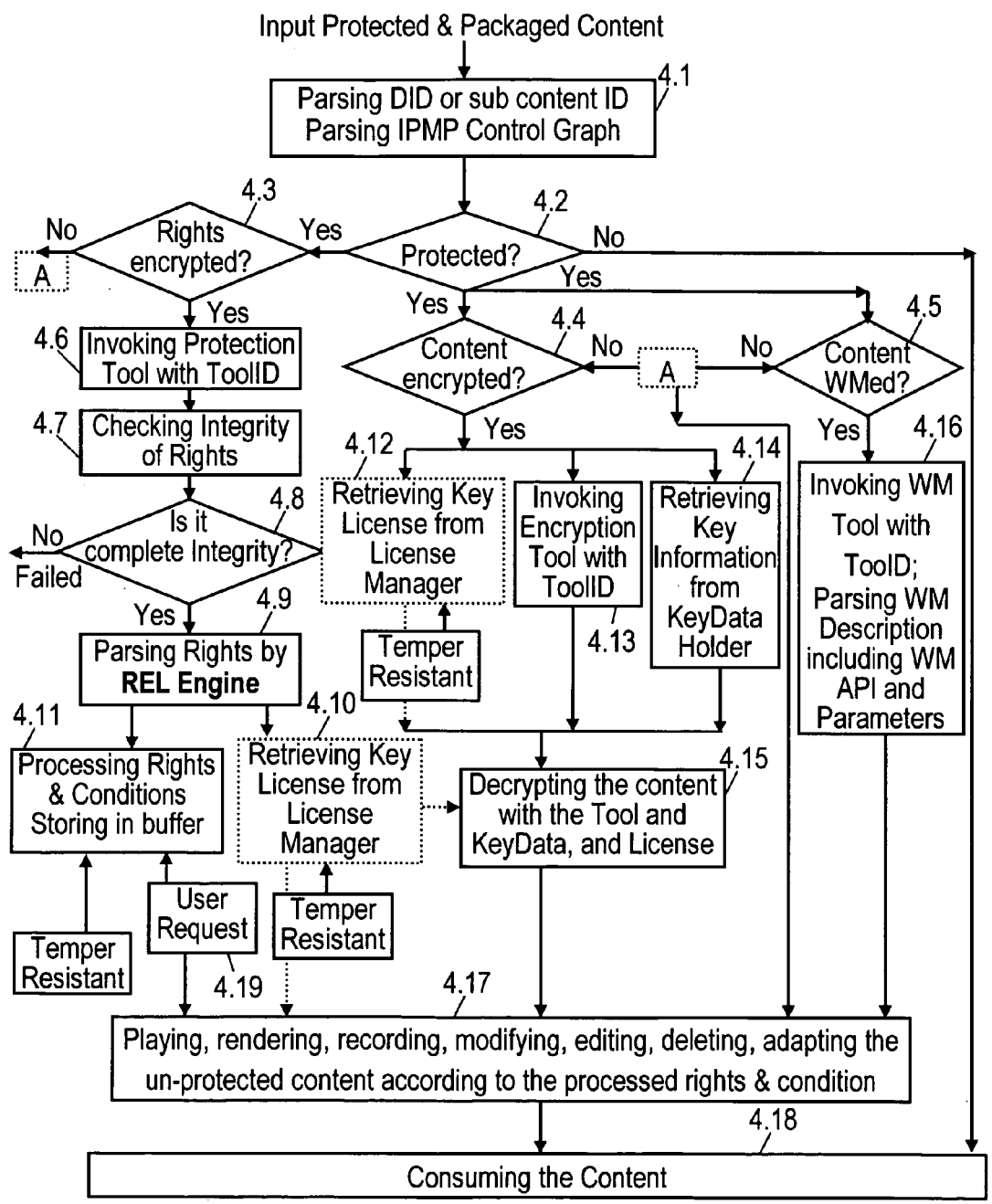
FIG. 4 shows Terminal Processing Flow Chart for Protected & Packaged Content with IPMP Control Graph Information.

Rights can be expressed by an independent and existing technology standard such as REL defined in MPEG-21 or other Rights Expression methods, and such rights could be protected by digital signature for its integrity. On the content consumption side as shown in FIG. 4, a packaged content with rights and protection information is subjected to IPMP Control Graph parsing, from there it can be known if the content is protected and furthermore to determine whether the content is encrypted, watermarked, or rights is protected as well.

The corresponding protection tools would be invoked and acted on the protected object, the tools can be those normative tools defined by MPEG-21 standard and hence installed in the device, or the tools can be proprietary and identified by tool IDs which can be downloaded from a remote location. Tool is identified by a registered Tool ID, which is a flag to tell terminal or device to prepare the corresponding tool or locate the tool beforehand. The key information is retrieved from a KeyData Holder defined and carried in an IPMP Control Graph directly or indirectly, and it would also possibly be obtained in segment with the corresponding content segment to be protected if the content is distributed through network.

The license information can be obtained from a License Manager which could be a tamper resistant entity to prevent any disclosure of how a license is retrieved by a license manager.

Rights and content are un-protected by using the above key, key data, and protection tool. Rights are further parsed by Rights Parser to obtain the rights and conditions in clear form, so that the rights and conditions processing can be conducted.

Therefore the un-protected content can be played back, rendered, modified, deleted, or adapted if there is such rights entitled for the user.

EXEMPLARY EMBODIMENT

Figure 1:
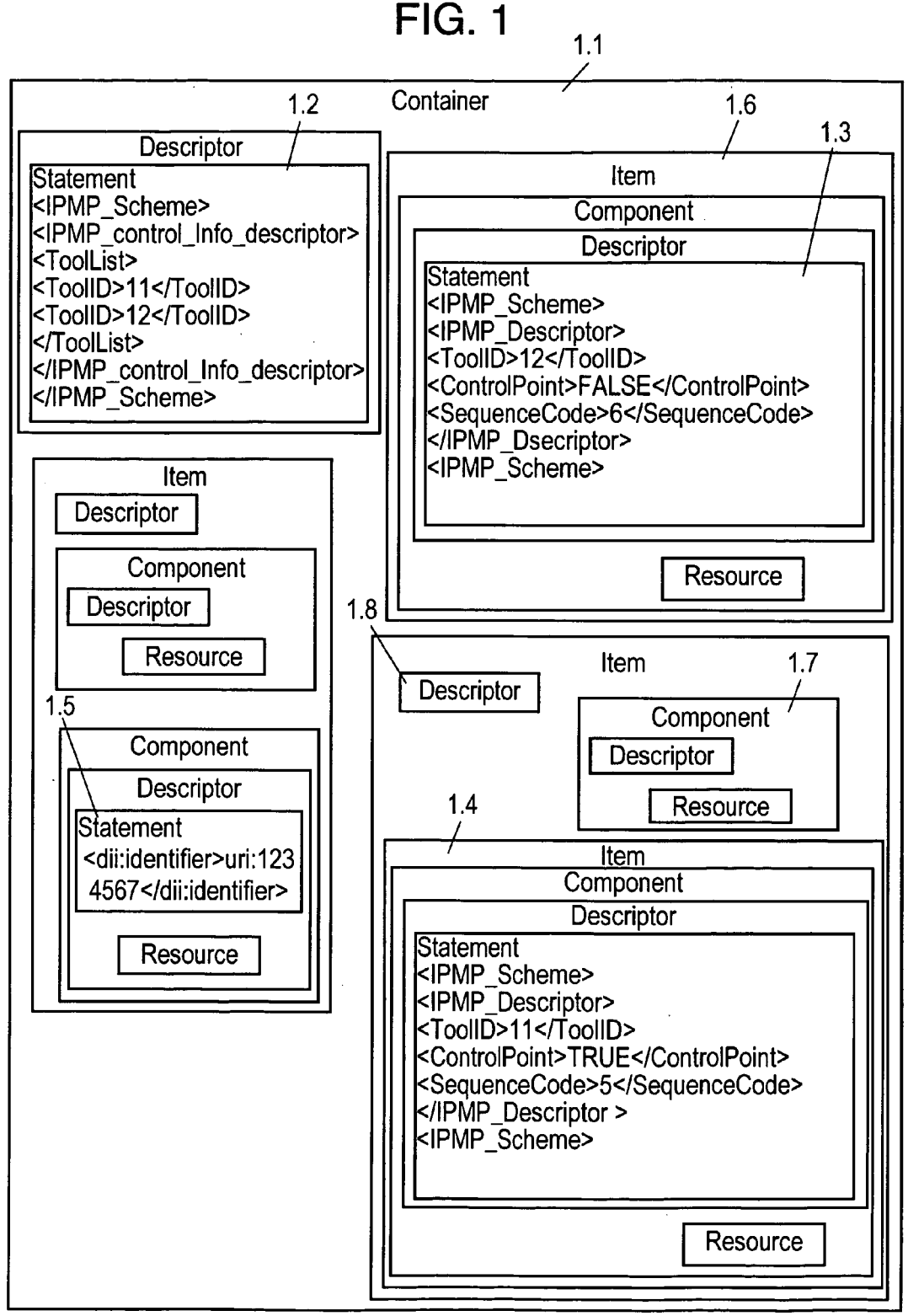
FIG. 1, shows a Prior Art DID Structure with Possible Protection Information Included.

As shown in FIG. 1 for the prior art [see reference 1 and 2], a digital content is packaged by DID with possible protection associated.

REFERENCE 1, 2

[1] "ISO/IEC 21000-2 MPEG-21 Digital Item Declaration FDIS", ISO/IEC JTC1 SC29/WG11/N4813, May 2002

[2] Patent on "Apparatus of a MPEG-21 System", inventors: Zhongyang Huang, Ming Ji, Shengmei Shen, Taka Senoh, Takuyo Kogure, Takafumi Ueno with internal patent number Pat01.028, filed in Japan in Feb. 2002.

The DID has defined a useful model (unit 1.1 in FIG. 1) formed by a set of abstract terms and concepts such as Container, Item, Component, Anchor, Descriptor, Condition, Choice, Selection, Annotation, Assertion, Resource, Fragment, Statement, etc (e.g., shown in FIG. 1 unit 1.6, 1.7, 1.8) for defining Digital Items.

Module 1.2 shown in FIG. 1 is the overall IPMP Control Information used for all the items to be protected inside this container. Module 1.3 and 1.4 are the specific protection information which is associated to the protected content. Module 1.5 is the DII to indicate the content ID.

Since DID is to address static relation among each elements and it can be treated as file format, rights and protection information, and can be directly associated to its protected content as IPMP_Control_Graph, shown in FIG. 3.

On the other hand, key information can be carried from KeyData Holder in IPMP_Control_Graph directly or indirectly. It could also be segmented when the content is delivered via a network.

Rights which might be encrypted are carried separately or together with protection information.

Figure 2:
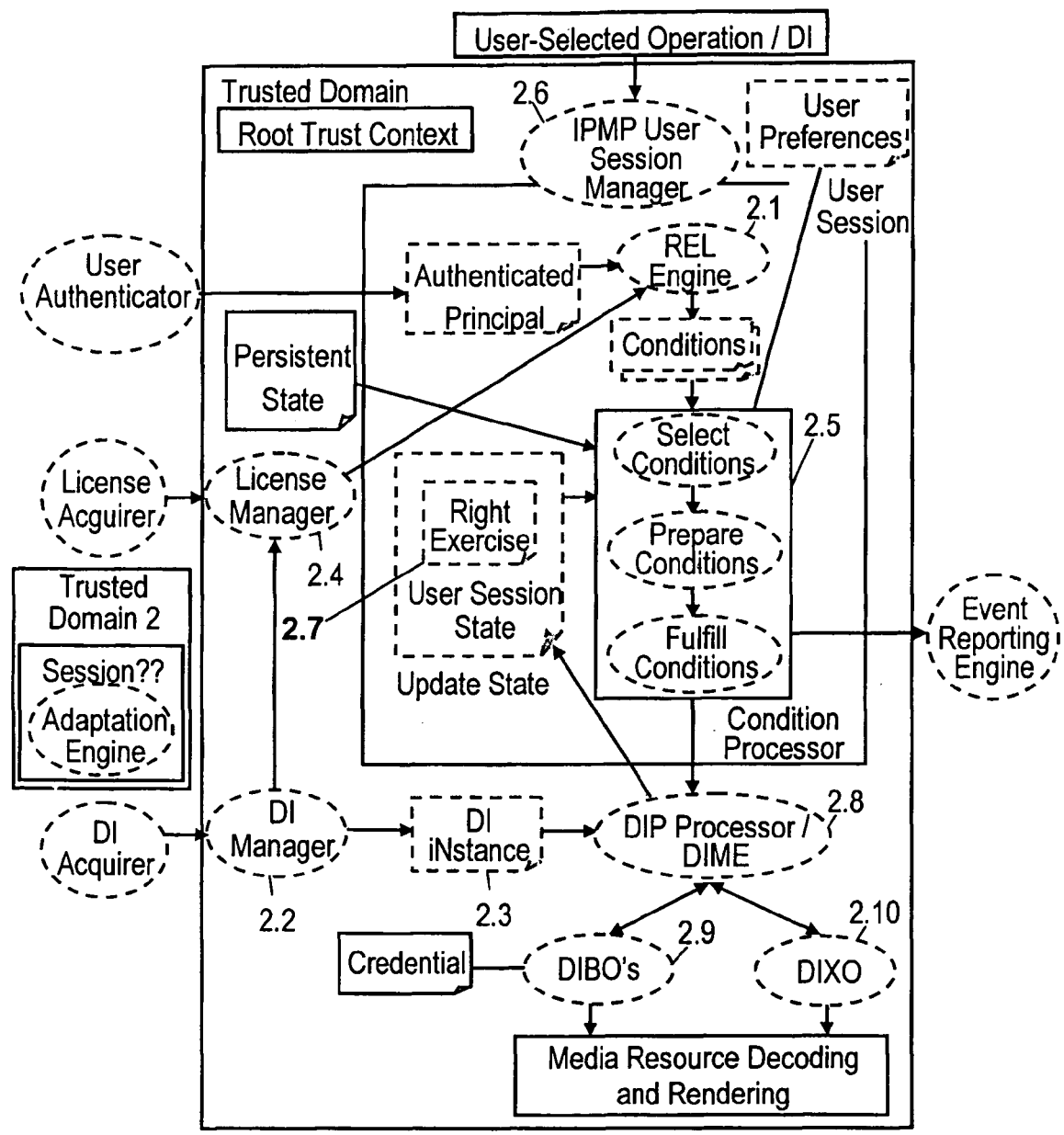
FIG. 2 shows a Prior Art MPEG-21 IPMP Architecture.

Another Prior Art is shown in FIG. 2 [see reference 3] for MPEG-21 IPMP Architecture.

REFERENCE 3

[3] "MPEG-21 Architecture, Scenarios and IPMP Requirements", ISO/IEC JTC1 SC29/WG11/N5874, July 2003

The Rights Expression Language (REL) Engine in module 2.1 is the component that determines REL authorizations, given an authorization request and a set of licenses and root grants. The REL Engine uses the License Manager to help resolve authorization queries.

The Digital Item Manager in module 2.2 parses Digital Item Declarations within Digital Items. The Digital Item Manager also provides access to where the Digital Items are located, and creates Digital Item iNstances in module 2.3. The Digital Item Manager passes to the License Manager any Licenses that are embedded within Digital Item Declarations.

The Digital Item iNstance in module 2.3 represents a Digital Item within a Trusted Domain. The Digital Item iNstance contains local metadata about the Digital Item, such as storage location and possibly information about content encryption keys.

The License Manager in module 2.4 supports the REL Engine by managing the persistent state of Licenses and their authorization or revocation status. The License Manager is also responsible for verifying the integrity of Licenses.

The Condition Processor in module 2.5 selects, evaluates and fulfills Conditions, and initiates the execution of authorized Operations (via the DIP Processor, generating a Right Exercise) once conditions are satisfied.

The IPMP User Session Manager in module 2.6 orchestrates the invocation of Digital Item Operations (via the Condition Evaluator), first making sure that proper authorization is obtained (via the REL Engine) and that conditions are evaluated (via the Condition Evaluator).

A Right Exercise in module 2.7 is a record of having exercised a right, i.e., the invocation of a Digital Item Operation. It is maintained by the User Session Manager, and is used to associate the fulfillment of Conditions with the exercise of Rights.

The Digital Item Processing Engine in module 2.8 executes Digital Item Operations, including Digital Item Methods (DIMs), Digital Item Basic Operations (DIBOs) in module 2.9, and Digital Item extended Operations (DIXOs) in module 2.10. The DIMs are executed by a DIM Engine, the DIXOs by a DIXO Engine, and the DIBOs by a DIBO Library. The Digital Item Processing Engine updates the User Session State with process state information.

The big issue with FIG. 2 is that there is no protection information to be processed, interpreted and transferred, especially when content is protected by several tools and rights is also protected using different tools. There is no clear picture for people to know how the content is protected and how it should be processed.

The second issue with FIG. 2 is that the data flow from License Manager should not go to REL Engine since the existing REL engine defined in MPEG-21 REL only processes rights expression. The output from license manager could contain the encryption key which is used to decrypt the content controlled by an entity which should be IPMP Manager shown in FIG. 9. The decryption itself can be done in IPMP Tools, DIP Processor, DIME, or DIBO, or DIXO.

The third issue with FIG. 2 is that there is no data flow indication to indicate where the REL data comes from, for the REL Engine to process. Such Rights Expression including rights conditions if they are expressed in MPEG-21 REL format, they could be carried as metadata together with DI in a DID container, and processed by DI Manager. DI Manager should be changed into DID Parser which only parses information by following what DID is defined.

The better rights and protection is designed based on the two cases. The first case is where the existing REL is employed for expressing the corresponding rights and conditions and a protection control mechanism is defined to take care of content protection including encryption, watermarking, key management. The second case is where the existing REL is extended by adding protection function which could include encryption, watermarking, key management, etc.

Both cases are elaborated in the following sections.

(Content Packaging and Consumption with Separate Rights and Protection)

As in FIG. 3, it is shown on the content packaging side with a rights and protection scheme. REL in module 3.8 is the existing rights expression language to be used to package the relevant rights with their conditions. Other parts through 3.3, 3.4, 3.5, 3.6, 3.7, 3.9, 3.11, and 3.13 are the protection related functions. The most important part is in module 3.15, which is the IPMP Control Graph. It can be carried in DID container in MPEG-21, but it also can be carried in other places in different application domains.

When the content is needed to transmit via network, normally it will be segmented, encrypted and stored as Resource somewhere, and the corresponding time-variant key is stored as Key Information in KeyData Holder in IPMP Control Graph in module 3.9 directly or indirectly by pointing to a location.

For example when the protected content is transmitted over RTP, the IPMP Control Graph can be carried in SDP (Section Description Protocol), while the key information can be carried in the RTP header or as special case for video and audio packet as long as there is synchronization among time-variant keys and the protected video or audio data.

Module 3.1 is for assigning content ID, wherein DII in MPEG-21 could be used here. If necessary sub content ID can be used and the protection can be associated with this sub content ID if the sub content needs to be protected.

Module 3.2 is for placing a flag in IPMP Control Graph to indicate whether the content is protected or free. Module 3.3 is for placing a flag in IPMP Control Graph to indicate whether is watermarking is embedded.

If there is watermarking embedded in the content, module 3.4 will assign watermarking (WM) ToolID for the WM tool used for this case, and ToolID is then recorded and placed in IPMP Control Graph. The module 3.5 will create WM Descriptions including watermarking Interface or API related information which is placed in IPMP Control Graph.

Module 3.6 is for determining whether the content will be encrypted, and a flag for "Yes/No" will be placed in IPMP Control Graph in module 3.15.

Module 3.9 is for assigning encryption ToolID for the encryption tool used for this case, and ToolID is then recorded and placed in IPMP Control Graph. The module 3.7 for placing Key information in KeyData Holder directly in IPMP Control Graph, or pointing by the Holder to other location.

The encryption key can be further encrypted in module 3.11, and 3.13, and the key as a license is eventually placed in IPMP Control Graph, REL, DID, or somewhere indicated by KeyLocation1.

Module 3.8 is for creating and packaging rights with the corresponding conditions which conforms to the existing REL standard, and this part could be modified and edited by distribution agents in the content distribution value chain.

The module 3.10 for protecting the rights metadata by digitally signing the rights. Module 3.12 is for assigning ToolID for the verification of the digital signature, and module 3.14 is for placing the Entity-Key in IPMP Control Graph, or in DID, or in somewhere indicated by KeyLocation2.

The detail of module 3.15 is shown in FIG. 7 (a) as an example in the case of MPEG-21 where XML based approach is used to express IPMP Control Graph. A DI (7.2, declared by a DID 7.1) consists of two Items (7.2, 7.3), each of which has their identification scheme (7.4, 7.5) with respective attached media resource (7.8, 7.9). Module 7.6 shows the IPMP Control Graph mentioned above and Module 7.7 gives the actual rights expression (conditions and usage rules) linked to the resource.

FIG. 4 shows the Terminal Processing Flow Chart to process protection & Packaging Information carried in IPMP Control Graph before a protected content could be consumed in module 4.18.

Module 4.1 is for parsing DID and IPMP Control Graph information where DID parser is required only for the case IPMP Control Graph is carried in DID in MPEG-21 case.

In the case of content distribution over RTP network, IPMP Control
Graph can be retrieved from SDP to obtain rights and protection description information except the key information if it is time-variant.

Module 4.2 is for detecting whether the content is protected or free. If it is free, it will be able to play back by module 4.18 for consumption. Otherwise there are three branches to go and check in modules 4.3, 4.4, and 4.5, respectively.

Module 4.3 is for detecting whether the Rights are encrypted, module 4.4 is for detecting whether the content is encrypted, and module 4.5 is for detecting whether the content is watermarked.

If the rights are protected, module 4.6 is for invoking the protection tool with ToolID and module 4.7 is for checking the integrity of the rights using the tool. If the integrity is successfully verified in module 4.8, the rights will be sent to module 4.9 for parsing the rights by REL Engine which conforms to the existing REL standard.

Module 4.11 is for processing the rights and conditions attached to the content and storing the entitled rights and conditions in a buffer. In module 4.19 those rights requested by the users are subjected to checking against the rights and conditions stored in the buffer.

If there is a license carried in the Rights, module 4.10 is retrieves the license from the License Manager which may be tamper resistant (TR) protected.

If the content is protected and encrypted, module 4.13 is invokes the encryption tool indicated by ToolID carried in IPMP Control Graph, module 4.14 is retrieves the Key Information, and module 4.12 is obtaining the key license from License Manager.

License Manager here could be protected by a tamper resistant technique if it is part of the terminal or somewhere in other places, since it will provide the actual license which the decryption engine will use to un-protect the content.

The encryption tool can be defined as default for most of the terminals to use in their implementation, while an IPMP ToolID is provided so that people can choose an encryption tool in their special domain rather than a default decryption tool. If the platform is allowed to download and use a different encryption tool indicated by ToolID, it would achieve extensibility, flexibility and renewability at the same time interoperability will be achieved across different domains.

Key Information could be retrieved from different places, in the case of content being delivered via various networks. This will depend on where the key information is placed. If the key information is placed in RTP header, you can get them there, while if you place them as other packets like video and audio data, you can get them by following the same rules applied to video and audio. The time-variant key information is required to obtain in the same time when you need to decrypt the video and audio content.

Module 4.15 is for decrypting the content with the invoked tool, KeyData, and License, and then passed to module 4.17 for further processing.

If the content is detected as watermarked in module 4.5, the watermarking tool with ToolID and its description data including interface will be invoked and prepared in module 4.16 for executing an action based upon a user's request.

Finally module 4.17 is for exercising the rights which user is requested based on the entitled rights & conditions, and acting on the un-protected content which is the output of module 4.15.

In FIG. 4 Tamper Resistant is used to protect the function of the License Manager for providing a license, and the Rights & Condition Processing for preparing the rights, even content decryption for obtaining un-protected content.

Figure 8:
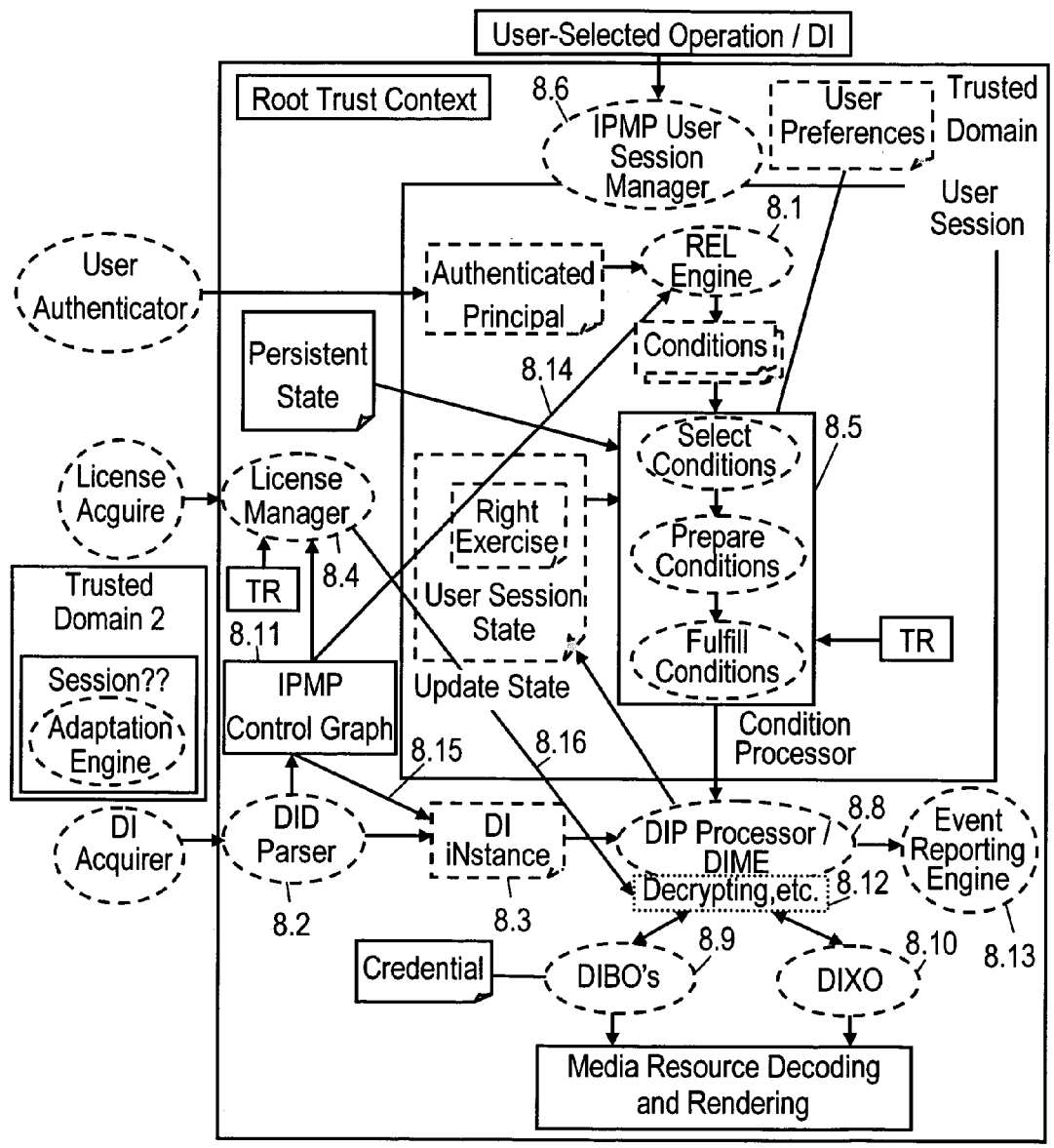
FIG. 8 shows IPMP Architecture with IPMP Control Graph Processed.

FIG. 8 shows a modified IPMP Architecture with REL and a IPMP Control Graph separately processed. Compared to the Rights and Protection (IPMP Related) functions in FIG. 4 and FIG. 8, it is clear that there are many IPMP related functions missing in the prior art of FIG. 2. Only the blocks in FIG. 4 including module 4.9 for the REL Engine, modules 4.10 and 4.12 for the License Manager, and module 4.11 for Conditions Processing, are introduced in the prior art as shown in FIG. 2. Such function blocks are module 2.1, module 2.4, and module 2.5 in FIG. 2.

As shown in FIG. 8, Module 8.11 is added for parsing and processing IPMP Control Graph information, and the corresponding results are passed to the License Manager in module 8.4, REL related data is passed to the REL Engine in module 8.1 after its integrity is checked, and content protection and watermarking information is passed to the DI iNstanace in module 8.3 for further processing.

Decrypting, watermarking, etc. in module 8,12, could be conducted in module 8.8 if such method is defined in DIME, or in module 8.9 if it is defined as one function of DIBO, or in module 8.10 if it is an external function.

The line 8.14 is shown for the data flow from IPMP Control Graph processing module to REL Engine, and the line 8.15 is shown for the data flow from IPMP Control Graph processing module to NI instance.

The line 8.16 is shows the data flow from the License Manager to the un-protecting block in the module 8.12 for issuing a license.

Module 8.13 is for Event Reporting Engine which is placed in the same trusted domain compared to that in FIG. 2.

TR means Tamper Resistance module to be used to protect License Manager operation and Condition Processing Operation.

Other modules have the similar meaning as explained in FIG. 2.

(Content Packaging and Consumption with Mixed Rights and Protection)

In this case, there is no clear boundary between rights and protection, and they are mixed. The IPMP Control Graph can be considered a REL-IPMP Control Graph.

Based on the current MPEG-21 REL or other rights expression language, protection of content as well as indicating how to protect the content is not defined. In this case the existing REL has to be extended to support such protection signaling.

Figure 5:
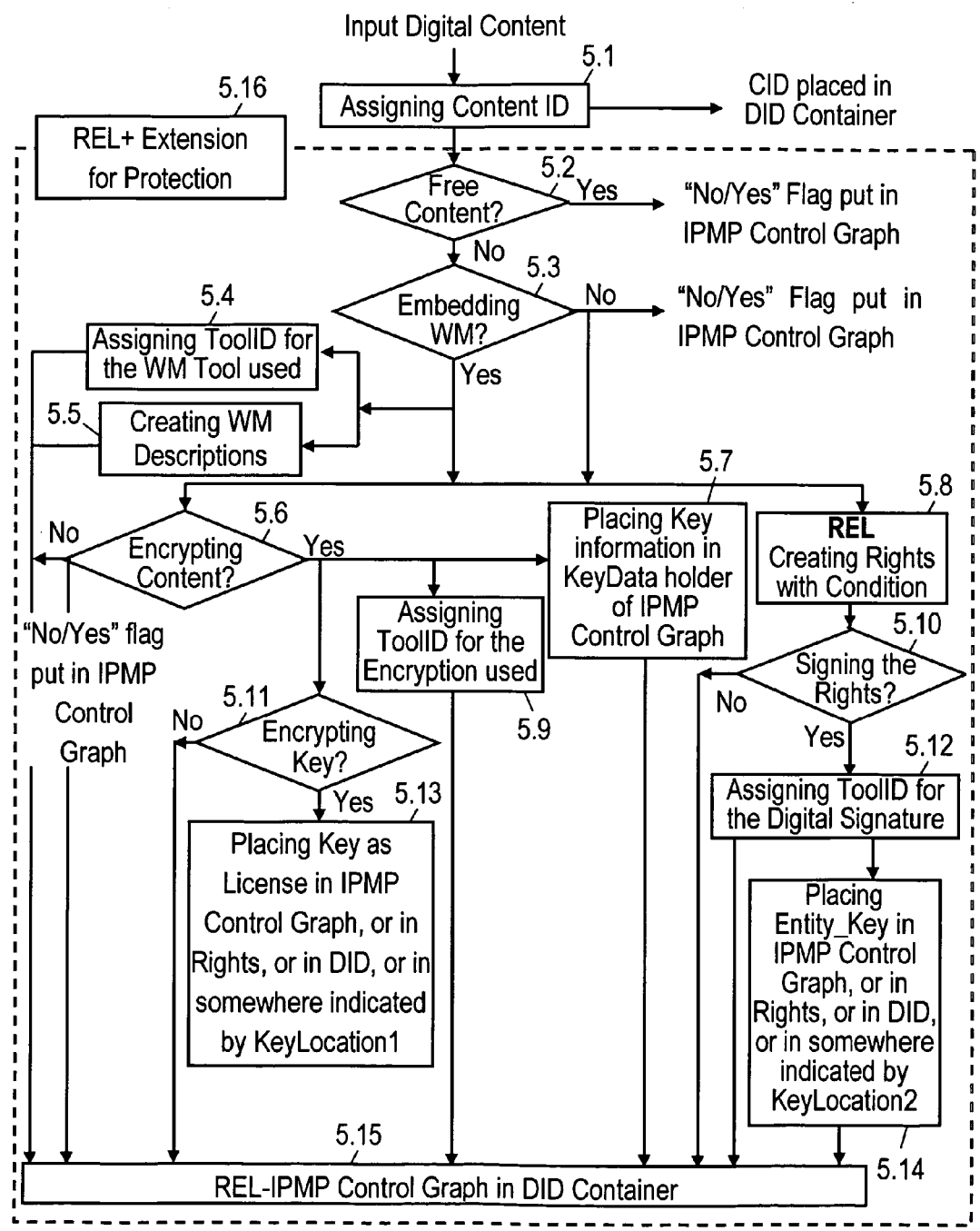
FIG. 5 shows Content Packaging Flow Chart with mixed Rights & Protection.

As shown in FIG. 5 which is based on FIG. 3, Module 5.16 is considered aREL+Extension to support content protection signaling by extending the existing REL standard, and module 5.15 is changed into REL-IPMP Control Graph. Module 5.8 is the existing REL function.

Other modules have the same functions as explained above.

As in FIG. 5, it is shown on the content packaging side with rights and protection scheme. REL in module 5.8 is the existing rights expression language to be used to package the relevant rights with their conditions. Other parts 5.3, 5.4, 5.5, 5.6, 5.7, 5.9, 5.11, and 5.13 are the protection related functions. The most important part is in module 5.15, which is the REL-IPMP Control Graph. It is carried in a DID container in MPEG-21, but it also can be carried in other places when it is used in different application domains.

When the content needs to be transmitted via a network, normally it will be segmented, encrypted and stored as Resource somewhere, and the corresponding time-variant key is stored as Key Information in the KeyData Holder in the REL-IPMP Control Graph in module 5.9 directly or indirectly by pointing to a location.

For example when the protected content is transmitted over RTP, the REL-IPMP Control Graph can be carried in SDP (Section Description Protocol), while the key information can be carried in the RTP header or as special case for video and audio packet as long as they are synchronized among time-variant keys and the protected video or audio data.

Module 5.1 is for assigning content ID, wherein DII in MPEG-21 could be used here. Module 5.2 is for placing a flag in the REL-IPMP Control Graph for indicating whether the content is protected or free. Module 5.3 is for placing a flag in REL-IPMP Control Graph to indicate if there is watermarking embedded.

If there is watermarking embedded in the content, module 5.4 will assign watermarking (WM) ToolID for the WM tool used for this case, and ToolID is then recorded and placed in the REL-IPMP Control Graph. The module 5.5 will create WM Descriptions including watermarking Interface or API related information which is placed in the REL-IPMP Control Graph.

Module 5.6 is for determining whether the content will be encrypted, and a flag for "Yes/No" will be placed in the REL-IPMP Control Graph in module 5.15.

Module 5.9 is for assigning encryption ToolID for the encryption tool used for this case, and the ToolID is then recorded and placed in REL-IPMP Control Graph. The module 5.7 is for placing the Key information in the KeyData Holder directly in REL-IPMP Control Graph, or pointing by the Holder to other location.

The encryption key can be further encrypted in module 5.11, and 5.13, and the key as a license is eventually placed in the REL-IPMP Control Graph, REL, DID, or somewhere indicated by KeyLocation1.

Module 5.8 is for creating and packing rights with the corresponding conditions which conforms to the existing REL standard, and this part could be modified and edited by distribution agents in the content distribution value chain.

The module 5.10 is for protecting the rights metadata by digitally signing the rights. Module 5.12 is for assigning ToolID for the verification of the digital signature, and module 5.14 is to place the Entity-Key in REL-IPMP Control Graph, or in DID, or in somewhere indicated by KeyLocation2.

The detail of module 5.15 is shown in FIG. 7 (*b*) as an example in the case of MPEG-21 where XML based approach is used to express REL-IPMP Control Graph. The figure is similar to FIG. 7 (*a*). It uses REL-IPMP Control Graph (7.10) to replace 7.6 and 7.7 modules as shown in FIG. 7 (*a*) but act as similar function to represent all rights and protection information.

It can be seen from the FIG. 7 (*b*) that the REL IPMP extension is defined here to contain not only rights expression but also protection descriptions, and such an extension is done on the top of the existing MPEG-21 REL or other Rights expression language since they are originally defined just to express rights, conditions, as well as principles and issuers. The ipmpx shown in the XML expression in FIG. 7 (*b*) is the part of the extension of REL for protection.

Figure 6:
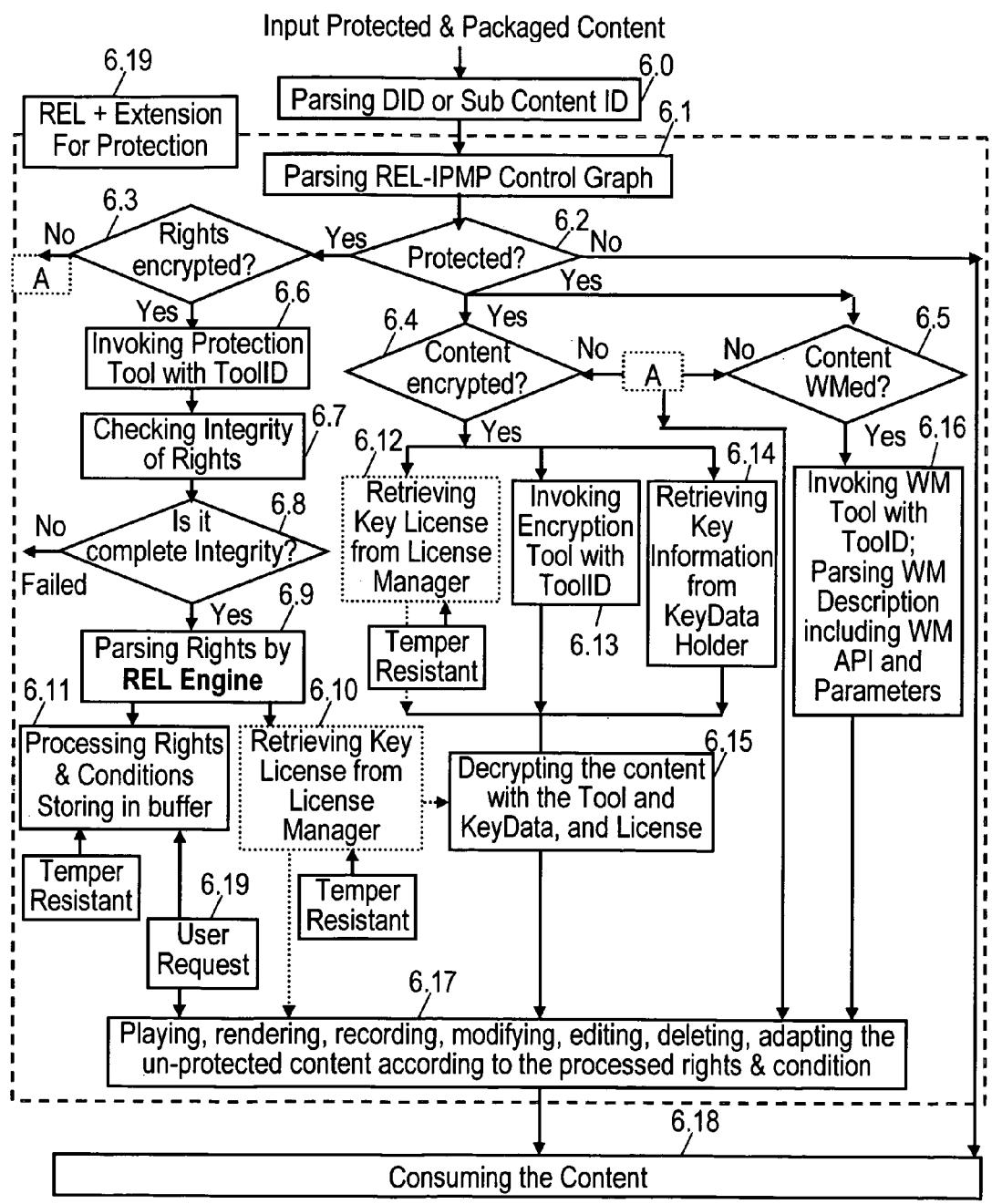
FIG. 6 shows Terminal Processing Flow Chart for Protected & Packaged Content with REL-IPMP Control Graph Information.

As shown in FIG. 6 which is based on FIG. 4, Module 6.19 is considered as REL+Extension to support content protection as well by the extended REL, and module 6.9 is the existing REL engine. Module 6.1 is changed into REL-IPMP Control Graph, and Module 6.0 is a separate DID parser in the case of MPEG-21.

Other modules are the same functions as explained in the above.

In FIG. 6 it is shown for the Terminal Processing Flow Chart to process protection & Packaging Information carried in REL-IPMP Control Graph before a protected content could be consumed in module 6.18.

Module 6.1 is for parsing the DID and the REL-IPMP Control Graph information where the DID parser is required only for a case in which REL-IPMP Control Graph is carried in the DID in MPEG-21.

In the case of content distribution over the RTP network, the REL-IPMP Control Graph can be retrieved from the SDP to obtain rights and protection description information except the key information if it is time-variant.

Module 6.2 is for detecting whether the content is protected or free. If it is free, it will be able to play back by module 6.18 for consumption. Otherwise there are three branches to go and check in modules 6.3, 6.4, and 6.5, respectively.

Module 6.3 is for detecting whether the Rights are encrypted, module 6.4 is for detecting whether the content is encrypted, and module 6.5 is for detecting whether the content is watermarked.

If the rights are protected, module 6.6 is for invoking the protection tool with ToolID and module 6.7 is for checking the integrity of the rights using the tool. If the integrity is successfully verified in module 6.8, the rights will be sent to module 6.9 for parsing the rights by REL Engine which conforms to the existing REL standard.

Module 6.11 is for processing the rights and conditions attached to the content and storing the entitled rights and conditions in a buffer. In module 6.19 those rights requested by the users are subjected to checking against the rights and conditions stored in the buffer.

If there is license carried in the Rights, module 6.10 retrieves the license from the License Manager which may be tamper resistant (TR) protected.

If the content is protected and encrypted, module 6.13 is invokes the encryption tool indicated by the ToolID carried in the REL-IPMP Control Graph, module 6.14 retrieves the Key Information, and module 6.12 is obtains the key license from the License Manager.

License Manager here could be protected by the tamper resistant technique if it is part of the terminal or somewhere in other places, since it will provide the actual license which the decryption engine will use to un-protect the content.

The encryption tool can be defined as a default tool for most of the terminals to use in their implementation, while an IPMP ToolID is provided so that people can choose an encryption tool from a special domain or case other than the default encryption tool. If the platform is allowed to download and use different encryption tool indicated by ToolID, it would achieve extensibility, flexibility and renewability at the same time we will achieve interoperability across different domains.

Key Information could be retrieved from different places in the case of content delivery via various networks. This will depend on where you place key information. If you place them in the RTP header, you can get them there, while if you place them as other packets like video and audio data, you can get them by following the same rules applied to video and audio. The time-variant key information is required to obtain in the same time when you need to decrypt the video and audio content.

Module 6.15 is for decrypting the content with the invoked tool, KeyData, and License, then passed to module 6.17 for further processing.

If the content is detected as watermarked in module 6.5, the watermarking tool with the ToolID and its description data including interface will be invoked and prepared in module 6.16 for action which is up to user's request.

Finally module 6.17 is for exercising the rights which the user requested based on the entitled rights & conditions, and acts on the un-protected content which is the output of module 6.15.

In FIG. 6 the Tamper Resistant is used to protect the functioning of License Manager to provide license, Rights & Condition Processing to prepare the rights, even content decryption for obtaining un-protected content.

Figure 9:
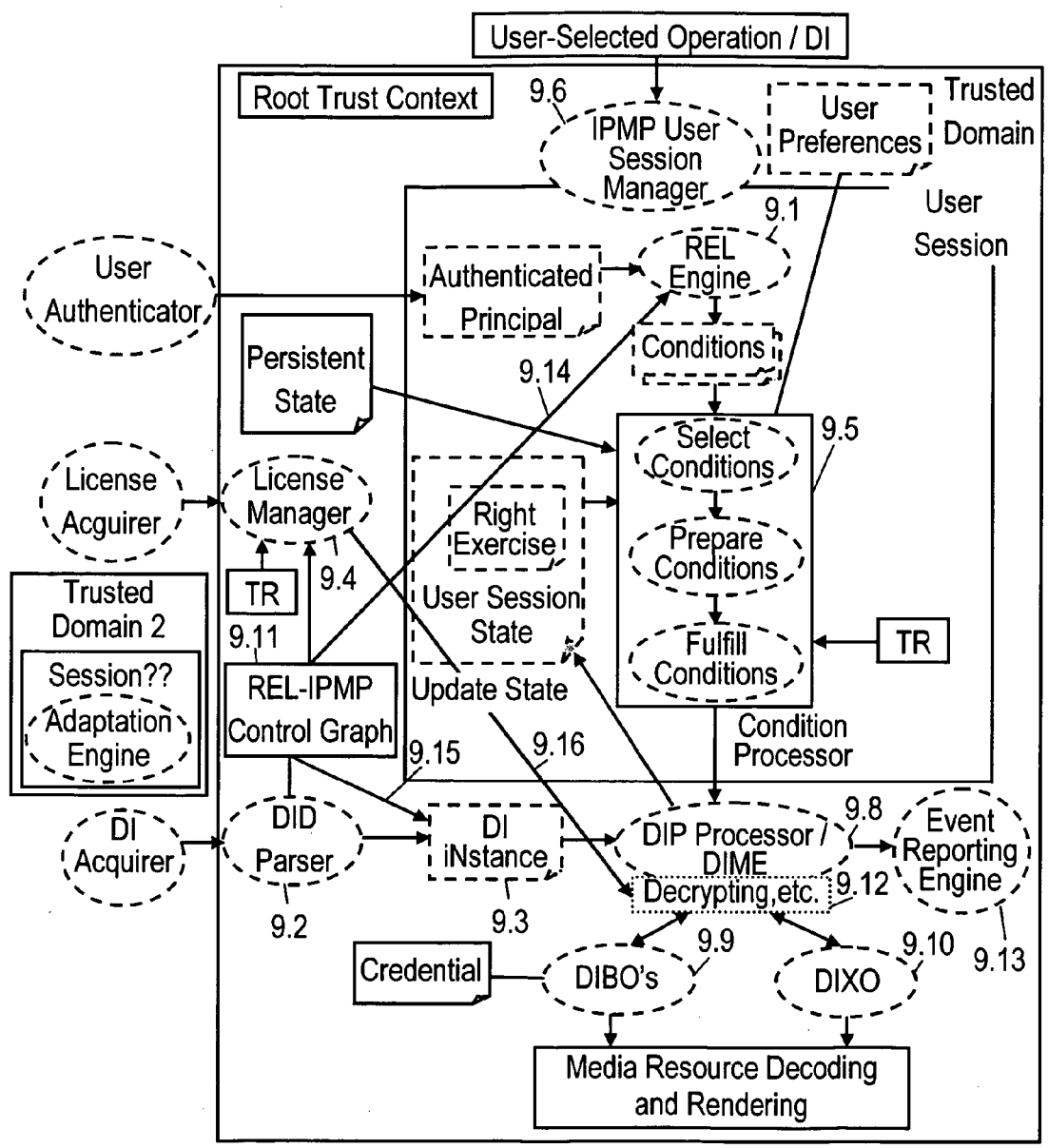
FIG. 9 shows IPMP Architecture with REL-IPMP Control Graph Processed.

FIG. 9 shows a modified IPMP Architecture with the REL-IPMP Control Graph processed. Compared to the Rights and Protection (IPMP Related) functions in FIG. 6 and FIG. 9, it is clear that there are many IPMP related functions missing in the prior art of FIG. 2. Only the blocks in FIG. 6 including the module 6.9 for the REL Engine, module 6.10 and 6.12 for the License Manager, and module 6.11 for the Conditions Processing, are introduced in the prior art as shown in FIG. 2. Such function blocks are module 2.1, module 2.4, and module 2.5 in FIG. 2.

As shown in FIG. 9, Module 9.11 is added for parsing and processing the IPMP Control Graph information, and the corresponding results are passed to the License Manager in module 9.4, the REL related data passed to the REL Engine in module 9.1 after its integrity is checked, and content protection and watermarking information is passed to the DI iNstanace in module 9.3 for further processing.

Decrypting, watermarking, etc. in module 9,12, could be conducted in module 9.8 if such method is defined in the DIME, or in module 9.9 if it is defined as one function of the DIBO, or in module 9.10 if it is an external function.

The line 9.14 is shown for the data flow from the REL-IPMP Control Graph processing module to the REL Engine, and the line 9.15 is shown for the data flow from the REL-IPMP Control Graph processing module to the NI iNstance.

The line 9.16 is shown for the data flow from the License Manager to the un-protecting block in the module 9.12 for issuing a license.

Module 9.13 is for the Event Reporting Engine which is placed in the same trusted domain compared to that in FIG. 2.

TR means Tamper Resistance module to be used to protect License Manager operation and Condition Processing Operation.

Other modules have the similar meaning as explained in FIG. 2.

Figure 10:
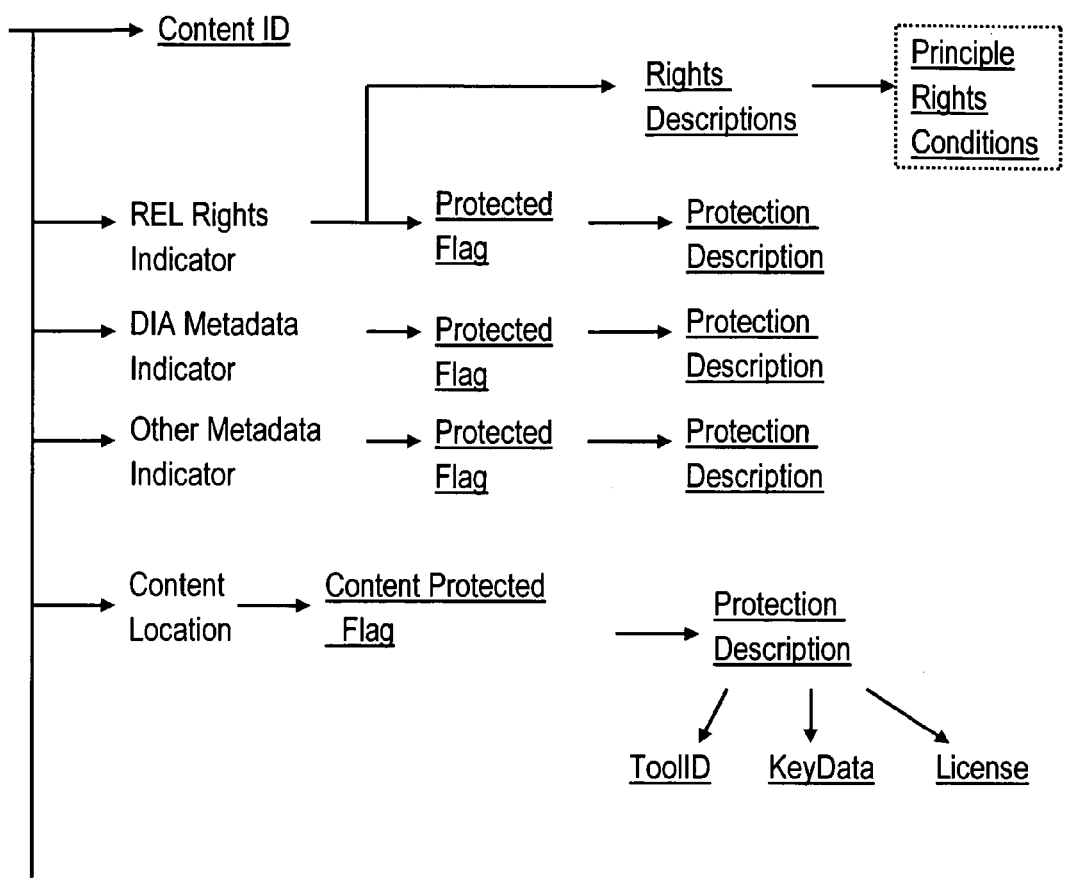
FIG. 10 shows Layout of Rights and Protection in REL-IPMP Control Graph.

In FIG. 10, the Layout of the Rights and Protection in the IPMP Control Graph or the REL-IPMP Control Graph is shown, where the content ID, the protected object's indicator, the protection flags, and the detail rights and conditions as well as the detail protection descriptions are placed and carried in this holder.

EFFECTIVE OF INVENTION

The invention is very effective when content is required to be protected with rights and conditions, especially such content can be in any data form and could be transmitted via various networks.

The invention is effective when such protection is required to associate with the protected content via content ID, especially such protection information is defined as a set of descriptions attached to the protected content using content ID, or DII in MPEG-21;

The invention is effective when such protection is placed in a generic IPMP Control Graph holder or REL-IPMP Control Graph holder, which is clean and convenient for content creation, content distribution, as well as content consumption, and such holder could be carried in DID in MPEG-21 static file format or carried in SDP for RTP transmission.

The invention is effective when each protection is indicated by the ToolID so that both the defined IPMP tool and the external IPMP Tool can be used for flexibility, renewalbility and extensibility.

The present invention relates to Digital Rights Management (DRM) or Intellectual Property Management and Protection (IPMP) for a generic digital content, and especially relates to the protection and management of a digital content independent of any data format. The invention is very effective when content is required to be protected with rights and conditions, especially such content can be in any data form and could be transmitted via various networks.

The invention claimed is:

1. A method of protecting digital content with digital rights expression, said method of protecting the digital content comprising:

parsing a digital item declaration (DID) related to digital content of a MPEG-21 scope, the DID carrying (i) a rights and protection holder containing rights and protection information applied to the digital content with a corresponding content identifier, and (ii) an intellectual property management and protection (IPMP) control graph holder or a right expression language (REL)-IPMP control graph holder;

retrieving a digital item identification (DII) which identifies the digital content;

detecting the IPMP control graph holder or the REL-IPMP control graph holder from the DID parsed by said parsing of the DID;

retrieving a flag from the IPMP control graph holder or the REL-IPMP control graph holder detected by said detecting, the flag indicating whether the digital content is protected content or free content;

processing description information carried in the IPMP control graph holder or the REL-IPMP control graph holder;

checking whether rights descriptions or metadata descriptions, related to the digital content, are digitally signed by retrieving a flag attached to rights or metadata related to the digital content, and, if the flag attached to the rights or the metadata indicates that the rights descriptions or the metadata descriptions are digitally signed, preparing a corresponding digital signing tool identified by a ToolID;

retrieving a key license from a protected license manager;

checking integrity of the rights or the metadata using the digital signing tool;

parsing rights and conditions of the rights according to predefined rules including REL rules, and storing entitled rights and conditions of the rights in a buffer for future checking;

checking whether the digital content is encrypted by retrieving a flag attached to the digital content, and, if the digital content is encrypted, preparing a corresponding encryption tool identified by a ToolID;

un-protecting the encrypted digital content (i) using the corresponding encryption tool with the ToolID identifying the corresponding encryption tool, and (ii) using other information;

checking if the digital content is watermarked by retrieving another flag attached to the digital content, and, if the digital content is watermarked, preparing a corresponding watermarking tool identified by a ToolID for further action;

processing a user's request for rights against entitled rights and conditions of the rights stored in the buffer;

exercising the rights requested by the user if the rights requested by the user are determined to be entitled by said processing of the user's request; and acting on the un-protected content by at least one of playing, rendering, recording, modifying, deleting, and adapting the un-protected content.

2. The method of protecting digital content according to claim 1, wherein said un-protecting of the encrypted digital content further includes:

retrieving key information from a key data holder of the IPMP control graph holder or the REL-IPMP control graph holder or retrieving the key information from a location pointed to by a pointer which is placed the IPMP control graph holder or the REL-IPMP control graph holder; and retrieving a generated key license from a protected license manager.

3. The method of protecting digital content according to claim 2, wherein said retrieving of the key license further comprises:

protecting the protected license manager according to a tamper resistant approach; and protecting a buffer storing the retrieved and generated key license according to the tamper resistant approach.

4. The method of protecting digital content according to claim 1, wherein said parsing of the rights and conditions of the rights further comprises:

protecting a rights parser used by said parsing of the rights and conditions of the rights, or protecting a part of the rights parser used by said parsing of the rights and conditions of the rights, according to a tamper resistant approach or another approach; and protecting the buffer according to the tamper resistant approach or other approaches.

5. The method of protecting digital content according to claim 1, wherein in said checking of whether the rights description or the metadata description are digitally signed, the metadata description is a digital item adaptation (DIA) or other type of metadata, which is capable of being protected, and wherein protection description information is placed in the IPMP control graph holder or the REL-IPMP control graph holder.

6. The method of protecting digital content according to claim 1 wherein (i) the encryption and decryption is performed using a defined tool identified by a ToolID by default for a certain application domain, (ii) the digital signing is performed using a defined tool identified by a ToolID by default for a certain application domain, and (iii) the watermarking is performed by defining an interface or application program interface (API) to achieve flexibility.

7. The method of protecting digital content according to claim 1, wherein said un-protecting of the encrypted digital content is performed using a digital item processing (DIP) engine as defined in a digital item method engine (DIME), a digital item base operation (DIBO), or a digital item extended operation (DIXO).

8. The method of protecting digital content according to claim 1, wherein (i) the REL-IPMP control graph holder extends an existing REL of MPEG-21 or other rights expression language to contain protection description information, and (ii) an IPMPX is defined as a flag used to represent an extension part of protection from an existing REL.

* * * * *